United States Patent
Abro

(10) Patent No.: US 10,894,492 B2
(45) Date of Patent: Jan. 19, 2021

(54) VEHICLE SEATS PROVIDING ACCESS TO CHILD SEAT RELEASE LATCHES

(71) Applicant: Toyota Motor Engineering & Manufacturing North America, Inc., Plano, TX (US)

(72) Inventor: Lauren Abro, West Bloomfield, MI (US)

(73) Assignee: TOYOTA MOTOR ENGINEERING & MANUFACTURING NORTH AMERICA, INC, Plano, TX (US)

( * ) Notice: Subject to any disclaimer, the term of this patent is extended or adjusted under 35 U.S.C. 154(b) by 0 days.

(21) Appl. No.: 16/364,750

(22) Filed: Mar. 26, 2019

(65) Prior Publication Data

US 2020/0307423 A1    Oct. 1, 2020

(51) Int. Cl.
| | | |
|---|---|---|
| *A47C 7/62* | (2006.01) | |
| *B60N 2/24* | (2006.01) | |
| *B60N 2/26* | (2006.01) | |
| *B60N 2/28* | (2006.01) | |
| *B60N 2/64* | (2006.01) | |

(52) U.S. Cl.
CPC ......... *B60N 2/2827* (2013.01); *B60N 2/2863* (2013.01); *B60N 2/643* (2013.01)

(58) Field of Classification Search
CPC ......... B60R 7/00; B60R 7/005; B60N 2/2824; B60N 2/2827; B60N 2/2842; B60N 2/2863; B60N 2/289
USPC ............ 297/188.04, 188.05, 188.06, 188.07, 297/250.1–256.16
See application file for complete search history.

(56) References Cited

U.S. PATENT DOCUMENTS

| | | | | |
|---|---|---|---|---|
| 3,019,050 | A * | 1/1962 | Spielman | B64D 11/0015 297/188.04 X |
| 3,596,987 | A * | 8/1971 | Wilson | B60N 3/004 297/188.07 |
| 4,707,024 | A * | 11/1987 | Schrader | B60N 2/2806 297/256.13 |
| 5,292,174 | A * | 3/1994 | Ohnuma | B60R 7/043 297/188.07 |
| 5,507,556 | A * | 4/1996 | Dixon | B60R 11/0235 297/188.04 X |
| 5,713,634 | A * | 2/1998 | Koike | B60N 2/643 297/378.13 |
| 5,913,533 | A * | 6/1999 | Lucas, Jr. | B60N 2/2833 224/275 |
| 6,059,358 | A * | 5/2000 | Demick | B60N 2/206 297/188.07 X |
| 6,199,948 | B1 * | 3/2001 | Bush | B60N 2/206 297/188.04 |

(Continued)

FOREIGN PATENT DOCUMENTS

| | | |
|---|---|---|
| CN | 2751397 Y | 1/2006 |
| CN | 205417255 U | 8/2016 |
| DE | 19549564 C2 | 8/1999 |

*Primary Examiner* — Rodney B White
(74) *Attorney, Agent, or Firm* — Dinsmore & Shohl LLP

(57) ABSTRACT

In one embodiment, a vehicle seat includes a seating portion and a seat back extending from the seating portion. The seat back defines a rear facing surface and a recessed area formed in the rear facing surface. The recessed area extends from an upper surface of the seat back toward a central portion of the seat back. The recessed area defines a void between the vehicle seat and a child seat positioned proximate to the seat back.

7 Claims, 4 Drawing Sheets

(56) References Cited

U.S. PATENT DOCUMENTS

| | | | |
|---|---|---|---|
| 6,217,112 B1 | 4/2001 | Linsenmeier et al. | |
| 6,484,915 B2* | 11/2002 | Butz | B60N 2/90 |
| | | | 224/539 |
| 6,578,912 B2* | 6/2003 | Hansen | B60N 2/0224 |
| | | | 297/188.04 |
| 6,592,179 B1* | 7/2003 | Miyazaki | B60N 2/60 |
| | | | 297/188.07 X |
| 6,641,212 B2* | 11/2003 | Sitzler | B60R 5/006 |
| | | | 297/188.06 X |
| 7,032,973 B2* | 4/2006 | Reubeuze | B60N 2/01541 |
| | | | 292/121 |
| 7,163,251 B2* | 1/2007 | Sitzler | B60R 5/006 |
| | | | 297/188.06 X |
| 7,350,858 B2* | 4/2008 | Hamamoto | B60R 7/04 |
| | | | 297/188.07 X |
| 7,488,034 B2* | 2/2009 | Ohren | B60N 2/2821 |
| | | | 297/256.16 X |
| 7,510,241 B2* | 3/2009 | Nathan | B60K 35/00 |
| | | | 297/188.04 X |
| 7,611,198 B2* | 11/2009 | Schweizer | B64D 11/00152 |
| | | | 297/188.07 X |
| 8,016,353 B2* | 9/2011 | Kuno | B60R 11/0235 |
| | | | 297/188.04 X |
| 8,141,948 B2* | 3/2012 | Cassellia | B60K 35/00 |
| | | | 297/188.04 X |
| 8,177,298 B2* | 5/2012 | Lindner | B60R 5/006 |
| | | | 297/188.07 |
| 8,186,757 B2* | 5/2012 | Duncan | B60N 2/2806 |
| | | | 297/256.13 |
| 8,702,169 B2* | 4/2014 | Abadilla | B60N 2/062 |
| | | | 297/256.16 X |
| 8,708,405 B2* | 4/2014 | Hayahara | B60N 2/36 |
| | | | 297/188.04 |
| 9,187,011 B2 | 11/2015 | Rouxel et al. | |
| 9,499,082 B2 | 11/2016 | Mueller | |
| 2003/0020308 A1* | 1/2003 | Pacella | B60N 2/2824 |
| | | | 297/256.16 |
| 2003/0189365 A1* | 10/2003 | Alexy | B63B 29/04 |
| | | | 297/256.16 X |
| 2004/0239155 A1* | 12/2004 | Fourrey | B60N 3/004 |
| | | | 297/163 |
| 2005/0110310 A1* | 5/2005 | Mayer | B60R 13/02 |
| | | | 297/188.06 |
| 2005/0204596 A1* | 9/2005 | Peng | G09F 9/00 |
| | | | 297/188.04 X |
| 2008/0238169 A1* | 10/2008 | Hicks | B60N 3/08 |
| | | | 297/353 |
| 2010/0244505 A1* | 9/2010 | Demick | B60N 2/879 |
| | | | 297/188.04 |
| 2011/0074194 A1* | 3/2011 | Weber | B60N 2/286 |
| | | | 297/256.13 |
| 2011/0089732 A1* | 4/2011 | Yang | B60N 2/2845 |
| | | | 297/256.16 |
| 2012/0013160 A1* | 1/2012 | Williams | B60N 2/2821 |
| | | | 297/256.16 |
| 2012/0181822 A1* | 7/2012 | Williams | B60N 2/2863 |
| | | | 297/256.16 X |
| 2012/0261961 A1* | 10/2012 | Heisey | B60N 2/2848 |
| | | | 297/256.16 |
| 2012/0326474 A1* | 12/2012 | Williams | B60N 2/2821 |
| | | | 297/256.16 X |
| 2014/0361589 A1* | 12/2014 | Hou | B60N 2/2821 |
| | | | 297/256.16 |
| 2016/0096461 A1 | 4/2016 | Coppuck | |
| 2016/0107582 A1* | 4/2016 | Dry | B60R 11/02 |
| | | | 297/188.07 |

* cited by examiner

VEHICLE SEATS PROVIDING ACCESS TO CHILD SEAT RELEASE LATCHES

TECHNICAL FIELD

The present specification generally relates to vehicle seats and, more specifically, to vehicle seats configured to provide access to child seat release latches.

BACKGROUND

Rear facing child seats (e.g., rear facing infant seats) may releasably attach to a carrier base installed within a vehicle. Such child seats may be provided with a release latch positioned near the top of the carrier. To release the child seat, a user typically reaches between the child seat and the back of the front seat to pull the release latch to release the child seat from the child seat base. In some instances, either due to seat position or vehicle size constraints, it may be difficult for the user to reach between the seat back and the child seat to pull the release latch. In some cases, a user might need to adjust the position of the front seat in order to release the release latch. Such adjustment may be inconvenient and time consuming for a user.

SUMMARY

In one embodiment, a vehicle seat includes a seating portion and a seat back extending from the seating portion. The seat back defines a rear facing surface and a recessed area formed in the rear facing surface. The recessed area extends from an upper surface of the seat back toward a central portion of the seat back. The recessed area defines a void between the vehicle seat and a child seat positioned proximate to the seat back.

In another embodiment, a vehicle includes a first vehicle seat, a second vehicle seat positioned rearward of the first vehicle seat in a vehicle longitudinal direction, and a child seat configured to be removably coupled to the second vehicle seat. The first vehicle seat includes a seating portion and a seat back extending from the seating portion. The seat back defines a rear facing surface and a recessed area formed within the rear facing surface. The recessed area extends from an upper surface of the seat back toward a central portion of the seat back. The child seat includes a release latch, wherein the release latch is aligned with the recessed area in the vehicle longitudinal direction such that the recessed area defines a void between the first vehicle seat and the release latch of the child seat.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure generally relates to a vehicle seat configured to provide accessibility to a release latch of a child seat positioned proximate thereto. In particular, the seat includes a seating portion configured to support a passenger thereon and a seat back extending from the seating portion. The seat back has a recessed area formed therein. The recessed area may extend from an upper surface of the seat back toward a central portion of the seat back. The recess area may define a void between the vehicle seat and the child seat to allow a user to reach within the void to actuate the release latch to release the child seat. Accordingly, a user may quickly and efficiently release the child seat via a child seat release latch without needing to adjust a position of either the front seat or the seat upon which the child seat is installed in order to release the child seat. These and additional features will be described in greater detail below.

As used herein, the term "vehicle longitudinal direction" refers to the forward-rearward direction of the vehicle (i.e., in the +/− vehicle X-direction as depicted in the figures). The term "vehicle lateral direction" refers to the cross-vehicle direction (i.e., in the +/− vehicle Y-direction as depicted in the figures), and is transverse to the vehicle longitudinal direction. The term "vehicle vertical direction" refers to the upward-downward direction of the vehicle (i.e., in the +/− vehicle Z-direction as depicted in the figures).

Figure 1:
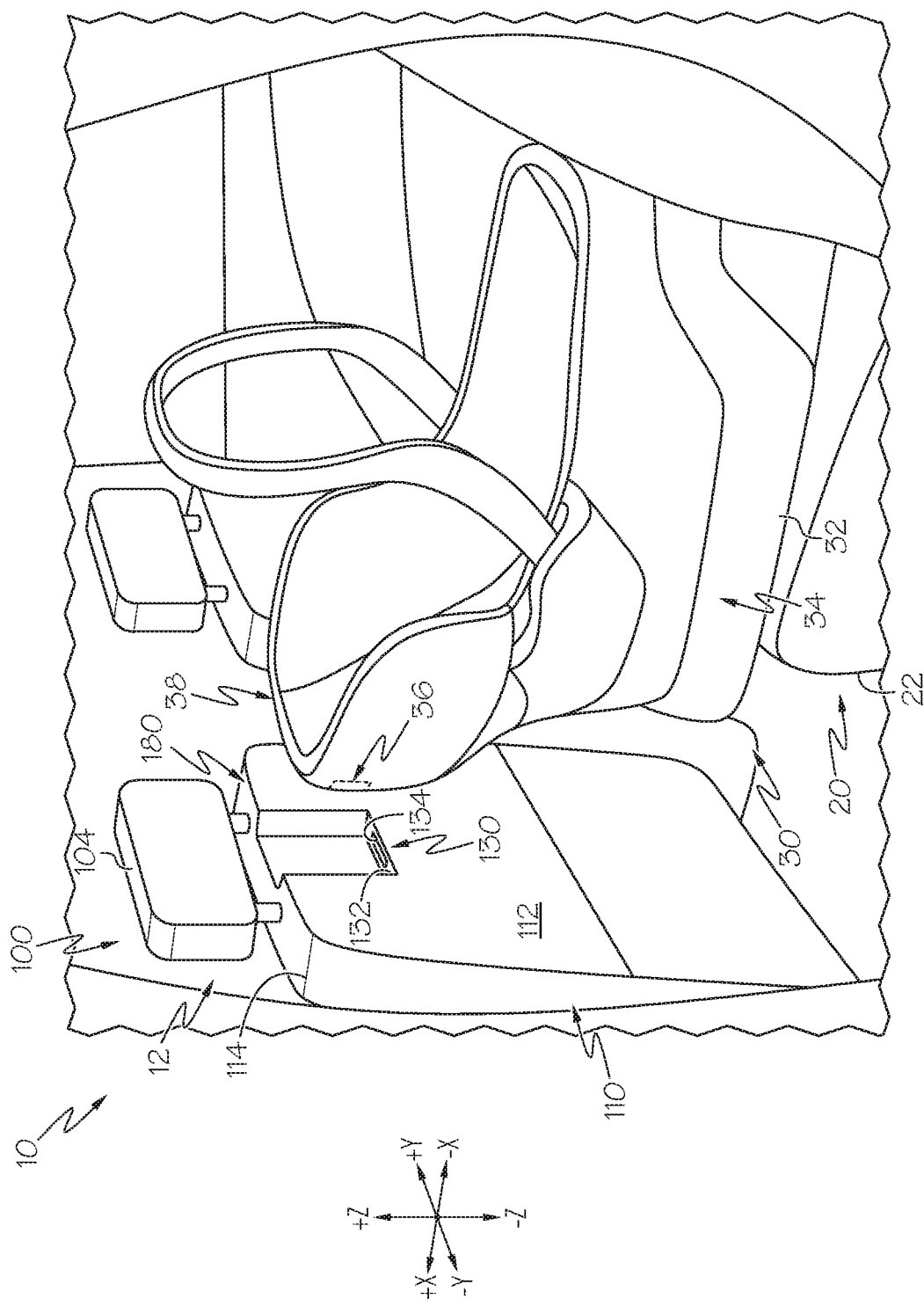
FIG. 1 depicts a perspective view of an interior of a vehicle, according to one or more embodiments shown and described herein.

Referring now to FIG. 1, a perspective view of an interior 12 of a vehicle 10 is generally depicted. Within the interior 12 of the vehicle 10 is a plurality of vehicle seats. For example, the vehicle 10 may include a first vehicle seat 100 (e.g., driver seat, front passenger seat, front bench seat, etc.) and a second vehicle seat 20 (e.g., a bench seat, bucket seat, etc.) positioned rearward of the first vehicle seat 100 in the vehicle longitudinal direction.

Removably coupled to the second vehicle seat 20 may be a child seat assembly 30. The child seat assembly 30 may include a base 32 removably coupled to a seat portion 22 of the second vehicle seat 20. In addition, the base 32 is removably coupled to a child seat 34. The child seat 34 may be removable from the base 32 using a release latch 36 configured to interact with latching mechanism (not shown) of the base 32 to release the child seat 34 from the base 32. In the illustrated embodiment, the child seat 34 is a rear facing child seat (e.g., an infant child seat) having a release latch 36 positioned proximate to a head rest portion 38 of the child seat 34. Typically, though not necessarily, to release a rear facing child seat 34 from its base 32, a user must reach from above the head rest portion 38 of the child seat 34 in the vehicle vertical direction and position their hand in between the first vehicle seat 100 and the headrest 104 of the child seat 34 to grasp the release latch 36 and pull the release latch 36 in an upward direction (e.g., in the +Z direction of the depicted coordinate axes) to release the child seat 34 from the base 32. Difficulties in manipulating the release latch 36 exist when there is insufficient clearance between the head rest portion 38 and/or the release latch 36 of the child seat 34 and the back of the first vehicle seat 100 to allow a user to fit her hand around the head rest portion 38 of the child seat 34. Embodiments described in greater detail herein provide additional clearance between the first vehicle seat 100 and the head rest portion 38 and/or the release latch 36 of the child seat 34.

Figure 2A:
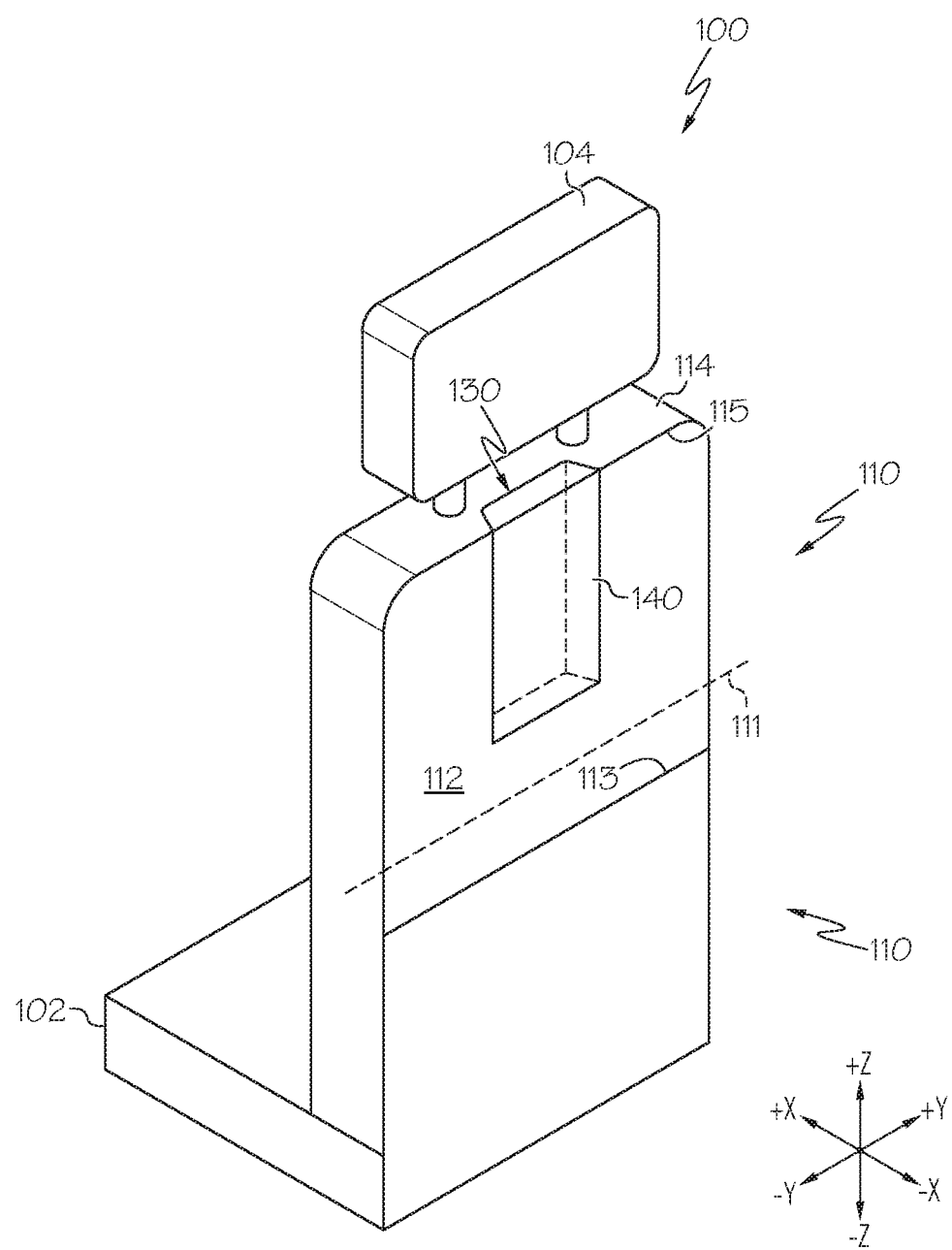
FIG. 2A depicts a perspective view of a seat of the vehicle of FIG. 1, according to one or more embodiments shown and described herein.
Figure 2B:
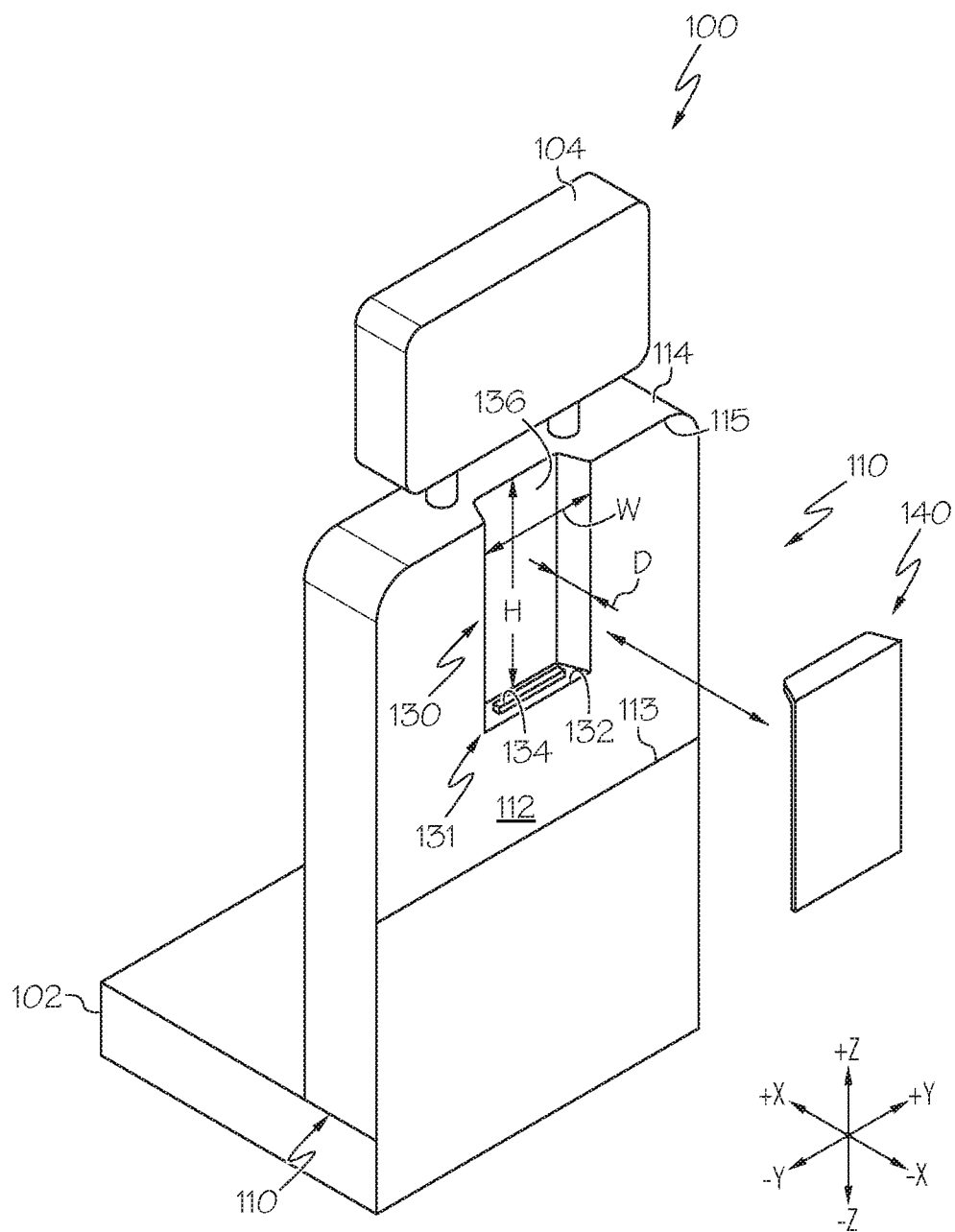
FIG. 2B depicts an exploded view of the seat of the FIG. 2A, according to one or more embodiments shown and described herein.

In particular, FIGS. 2A and 2B generally illustrate an embodiment of the first vehicle seat 100 in isolation. As illustrated, the first vehicle seat 100 includes a seating portion 102 configured to support a passenger thereon and a seat back 110 extending from the seating portion 102. In various embodiments, a headrest 104 may extend from the seat back 110 to provide additional comfort and support to a passenger sitting on the first vehicle seat 100.

The seat back 110 may define a rear facing surface 112 directed toward the second vehicle seat 20, as illustrated in FIG. 1 (e.g., in the −X direction of the depicted coordinate axes of FIG. 2A). The seat back 110 may further define an upper surface 114 coupled to the rear facing surface 112. In some embodiments, the rear facing surface 112 may smoothly transition into the upper surface 114 such that a point of transition between the rear facing surface 112 and the upper surface 114 is not clearly defined. In other embodiments and as illustrated, the upper surface 114 and the rear facing surface 112 may be connected by a defined edge 115. For example, the rear facing surface 112 and the upper surface 114 may be positioned orthogonally, or at some other non-zero angle, relative to one another.

Still referring to FIGS. 2A and 2B, formed within the rear facing surface 112 is a recessed area 130. The recessed area 130 may have a height, H, in the vehicle vertical direction, a width, W, in the vehicle lateral direction, and a depth, D, in the vehicle longitudinal direction. The height H refers to the vertical extent of the recessed area 130 within the seat back 100. For example, the recessed area 130 may extend from (e.g., through) the upper surface 114 to a central portion 111 of the seat back 100. In some embodiments, attached to the rear facing surface 112 of the first vehicle seat 100 may be a pocket 113. In such embodiments, the recessed area 130 may end before reaching the pocket 113. Stated another way, the pocket 113 may be positioned below the recessed area 130 and the central portion 111 in the vehicle vertical direction. In some embodiments, the recessed area 130 may extend along an entire length of the rear facing surface 112 of the seat back 110. In any case, the recessed area 130 may have a height sufficient to allow a user to reach the release latch of the child seat 34 via the recessed area 130.

Figure 3:
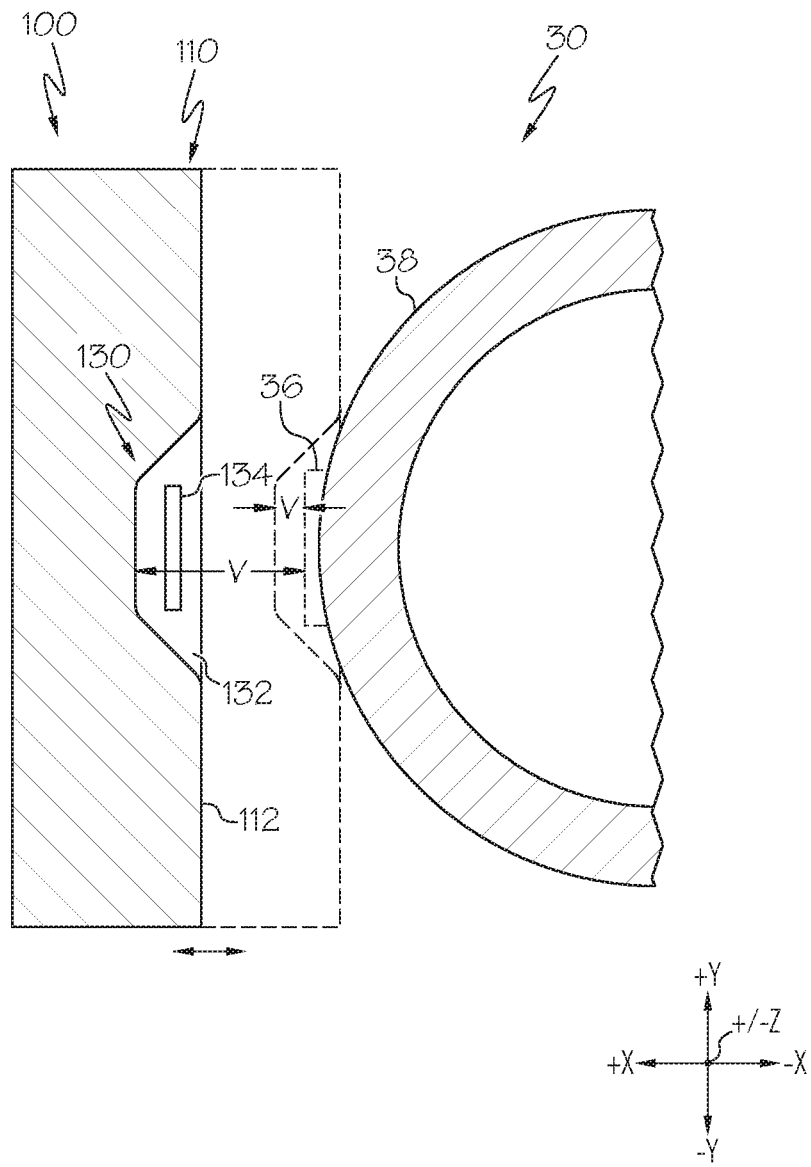
FIG. 3 depicts a top cross-sectional view of a vehicle seat and a child seat positioned proximate to the vehicle seat, according to one or more embodiments shown and described herein.

The width, W, refers to the lateral extent of the recessed area 130 within the seat back 100. In some embodiments, of the recessed area 130 may be less than a width of a head rest portion 38 of the child seat 34. That is, the recessed area 130 may be narrow enough to prevent the read rest portion 38 of the child seat 34 from completely nesting within the recessed area 130 so as to block access to the release latch 36 through the recessed area 130. For example, FIG. 3 illustrates a top cross-sectional view of the seat back 110 positioned proximate to the head rest portion 38 of the child seat 34. In some cases, the vehicle seat 100 may be adjustable such that the seat back 100 may be moved into contact with the head rest portion 38 of the child seat 34. However, even when in contact with the head rest portion 38 of the child seat 34, the recessed area 130 allows a user to still reach a hand between the seat back 110 and the head rest portion 38 of the child seat 34 by defining a void, V, between the vehicle seat 100 and the child seat (e.g., the head rest portion 38 and/or the release latch 36). In some embodiments, the width, W, of the recessed area 130 may be about 3-8 inches wide (e.g., 5 inches) to still provide adequate room for a user's hand to be inserted in to the recessed area 130. In some embodiments, the recessed area 130 may be large enough to dispose a tablet or other user entertainment device therein.

Referring again to FIGS. 2A and 2B, the depth, D, of the recessed portion 130 refers to the longitudinal extent of the recessed portion into the seat back 100. In embodiments, the depth, D, may be large enough to allow a user to comfortably insert her hand and manipulate a release latch on the child seat 34. Accordingly, the recessed portion may be at least about 2 inches deep. However, it is noted that or smaller depths are contemplated and possible.

In some embodiments the seat back 100 defines a ledge 132 at a base 131 of the recessed area 130. The ledge 132 may provide a surface upon which items may be placed. In some embodiments, a stop 134 may extend from the ledge 132 in the +Z direction of the depicted coordinate axes and provide a barrier to hold items within the recessed area 130. The stop 131 may extend along the width, W, of the recessed area 130. In some embodiments, the stop 131 may extend across an entire width, W, of the recessed area 130 or only a portion thereof. The stop 131 may be spaced from a backing wall 136 of the recessed area in the vehicle longitudinal direction (e.g., the −X direction of the depicted coordinate axes). Such spacing may allow the stop 131 to be used to prevent objects placed within the recessed area 130 from fall or slide out of the recessed area 130. For example, in some embodiments, the recessed area 130 may be used as a support for holding a tablet or other user entertainment device. The stop 134 may prevent the tablet or other user entertainment device from sliding out of the recessed area 130. Such embodiments may provide additional utility for the recessed area 130 when a front facing child seat or no child seat is used within the vehicle 10.

Still referring to FIGS. 2A and 2B, in some embodiments, the vehicle seat 100 may include a removable cover 140 sized and shaped to cover the recessed portion 130. For example, the removable cover 140 may be produced of molded plastic and configured to snap over the recessed area 130 to camouflage or otherwise conceal the recessed area 130 when not in use. FIG. 2A illustrates the removable cover mounted to the recessed area 130 whereas FIG. 2B illustrates an exploded view wherein the removable cover is moved away from the recessed area 130. In some embodiments, there may be no removable cover.

As noted above, FIG. 3 illustrates a top cross-sectional view of the vehicle seat 100 and a head rest portion 38 of a child seat 34 positioned proximate to the seat back 110 of the vehicle seat 100. The recessed area 130 may be shaped and/or positioned to correspond to the child seat 34. For example, and as illustrated, the recessed area 130 is oriented so as to be aligned with the release latch 36 of the child seat 34. Such positioning allows the recessed area 130 to define a void, V, between the vehicle seat and child seat positioned proximate to the seat back. The width of the void, V, is adjusted based on the position between the vehicle seat 100 relative to the child seat 34. However, as noted above, the recessed area 130 is sized such that even if the vehicle seat 100 is contacted to the child seat 34, a void, V, is still provided that is sufficient to allow a user to reach within the recessed portion 130 to actuate the release latch 36. Accordingly, because the recessed portion provides adequate clearance between the release latch 36 and the vehicle seat 100, neither the vehicle seat 100 nor the seat upon which the child seat 34 is installed need be adjusted to allow a user to reach and operate the release latch 36.

It is noted that while a recessed area is only illustrated as being positioned within one seat of the vehicle 10 (e.g., a front passenger vehicle seat and/or a front driver vehicle seat), similar recessed areas may be positioned in any or all of the vehicle seats. In some embodiments, a recessed area is formed within any seat behind which another seat is positioned. For example, recessed areas in a second row of seat within a vehicle having a third row of seats positioned behind the second row.

It should now be understood that embodiments provided herein are directed to a vehicle seat configured to provide accessibility to a release latch of the child seat positioned proximate thereto. In particular, such vehicle seat includes a seating portion configured to support a passenger thereon and a seat back extending from the seating portion. The seat back that has a recessed area formed therein. The recessed area may extend from an upper surface of the seat back to a central portion of the seat back. The recessed area may define a void between the vehicle seat and the child seat to allow a user to reach within the void to actuate the release latch to release the child seat. Accordingly, a user may quickly and efficiently release the child seat via the child seat release latch without needing to adjust a position of either the front seat or the seat upon which the child seat is installed.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a first vehicle seat comprising:
      a seating portion; and
      a seat hack extending from the seating portion, the seat back defining a rear facing surface and a recessed area formed within the rear facing surface, the recessed area extending from an upper surface of the seat back toward a central portion of the seat back and having a width in a vehicle lateral direction and a backing wall recessed from the rear facing surface;
   a second vehicle seat positioned rearward of the first vehicle seat in a vehicle longitudinal direction; and
   a child seat including a base configured to be removably coupled to the second vehicle seat, the child seat configured to be coupled to the base in a rear facing direction, the child seat comprising a head rest portion and a release latch located on a back surface of the head rest portion of the child seat; the release latch configured to interact with a latching mechanism of the base to release the child seat from the base, wherein the release latch is positioned on the child seat so that it is adjacent and aligned with the recessed area in the vehicle longitudinal direction when the child seat is coupled to the second vehicle seat in the rear facing direction such that the recessed area defines a void between the first vehicle seat and the release latch of the child seat;
   wherein the width of the recessed area is smaller than a lateral width of the head rest portion of the child seat, and sized to prevent the head rest portion of the child seat from contacting the backing wall of the recessed area when the rear facing surface of the first vehicle seat is moved in a direction toward the child seat.

2. The vehicle of claim 1, wherein the first vehicle seat is a front passenger seat.

3. The vehicle of claim 1, wherein the recessed area is at least 3 inches wide in a vehicle lateral direction.

4. The vehicle claim 1, wherein the recessed area comprises a depth of at least 2 inches.

5. The vehicle claim 1, wherein the seat back defines a ledge at a base of the recessed area.

6. The vehicle claim 5, the seat back further comprising a stop extending from the ledge.

7. The vehicle claim 5, further comprising a removable cover that is removably coupled to the seat back over the recessed area to conceal the recessed area.

* * * * *

UNITED STATES PATENT AND TRADEMARK OFFICE
CERTIFICATE OF CORRECTION

PATENT NO. : 10,894,492 B2  
APPLICATION NO. : 16/364750  
DATED : January 19, 2021  
INVENTOR(S) : Lauren Abro Page 1 of 1

It is certified that error appears in the above-identified patent and that said Letters Patent is hereby corrected as shown below:

In Column 6, Line(s) 5, Claim 1, delete "hack" and insert --back--, therefor.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*